United States Patent [19]

Perry

[11] Patent Number: 5,375,774
[45] Date of Patent: Dec. 27, 1994

[54] TIP SEPARATOR AND METHOD OF OPERATION FOR FLUORESCENT TUBE DIGESTER

[76] Inventor: Timothy J. Perry, 1875 Piedras Cir., Danville, Calif. 94526

[21] Appl. No.: 60,489

[22] Filed: May 11, 1993

Related U.S. Application Data

[63] Continuation of Ser. No. 732,187, Jul. 18, 1991, abandoned.

[51] Int. Cl.$^5$ .................. B02C 23/38; B02C 23/40
[52] U.S. Cl. ........................... 241/14; 241/24; 241/57; 241/60; 241/79; 241/99; 241/19
[58] Field of Search .............. 241/99, 24, 18, 19, 241/57, 60, 79, 292.1, 14; 269/389, 393, 674, 396, 261, 314

[56] References Cited

U.S. PATENT DOCUMENTS

| | | |
|---|---|---|
| 19,175 | 1/1858 | Hoyt . |
| 109,969 | 12/1870 | Thomas . |
| 155,702 | 10/1874 | Brown . |
| 431,176 | 7/1890 | Thissell ................. 209/674 X |
| 566,260 | 8/1896 | Wightman . |
| 664,811 | 12/1900 | Lippy . |
| 843,785 | 2/1907 | Allen . |
| 1,187,238 | 6/1916 | Beaumont . |
| 1,248,686 | 12/1917 | Lindh . |
| 1,263,114 | 4/1918 | Rice . |
| 1,275,713 | 8/1918 | McKee . |
| 1,316,165 | 9/1919 | King . |
| 1,485,872 | 3/1924 | Nelson .................. 209/393 X |
| 1,545,769 | 7/1925 | Hiller . |
| 1,916,192 | 7/1933 | Daird ..................... 241/292.1 |
| 2,091,772 | 8/1937 | Steele . |
| 2,296,608 | 9/1942 | Gately .................. 241/292.1 |
| 2,419,898 | 4/1947 | Johnson ................ 209/389 X |
| 2,600,508 | 6/1952 | Lehman et al. ........ 241/79 X |
| 2,775,347 | 12/1956 | Weston . |
| 2,910,097 | 11/1959 | Rose . |
| 3,154,622 | 10/1964 | Reinfeld et al. ........ 209/393 X |
| 3,191,774 | 6/1965 | Schrader . |
| 3,221,877 | 12/1965 | Kening ................... 209/314 |
| 3,241,671 | 3/1966 | Brauchla ................ 209/314 X |
| 3,506,122 | 4/1970 | Ranger . |
| 4,049,204 | 9/1977 | McKee ................... 241/292.1 X |
| 4,084,755 | 4/1978 | Shimolizaka et al. .. 241/99 X |
| 4,209,097 | 6/1980 | Nordmark . |
| 4,763,794 | 8/1988 | Billington, III et al. . |
| 4,956,078 | 9/1990 | Nagerowski et al. ... 209/674 X |
| 5,042,724 | 8/1991 | Perry ...................... 241/99 X |
| 5,092,527 | 3/1992 | Perry et al. ............. 241/99 X |

FOREIGN PATENT DOCUMENTS

| | | |
|---|---|---|
| 248198 | 12/1987 | European Pat. Off. ...... 241/99 |
| 549417 | 4/1932 | Germany . |
| 3610355 | 10/1987 | Germany . |
| 3909380 | 9/1990 | Germany . |
| 96630 | 6/1984 | Japan ...................... 241/99 |
| 931110 | 7/1963 | United Kingdom . |
| 0873967 | 10/1981 | U.S.S.R. ................. 241/292.1 |
| 1005712 | 3/1989 | U.S.S.R. ................. 241/292.1 |
| 8301396 | 4/1983 | WIPO .................... 241/99 |

Primary Examiner—Timothy V. Eley
Assistant Examiner—Frances Han
Attorney, Agent, or Firm—Charles A. Wilkinson

[57] ABSTRACT

A grizzly-type separator is disposed across the path of fractured glass particulates to separate electrical tips from said glass particulates. The separator is formed preferably from round separator bars of about twice the average maximum diameter of fractured glass and about equal to the maximum average diameter of the fractured glass particulates. The separator bars are discontinuous in the center to cause a change in orientation of objects moving down the bars and are secured together by cross bars spaced significantly from the separator bars.

6 Claims, 3 Drawing Sheets

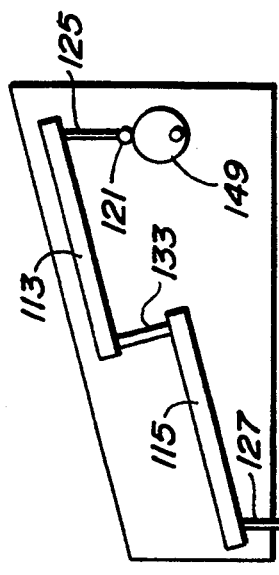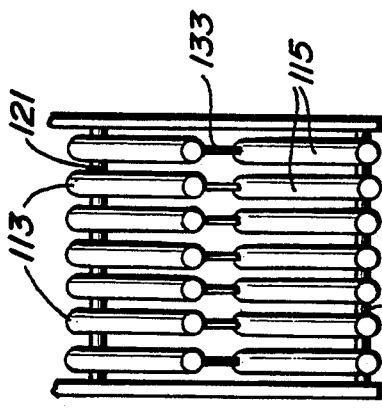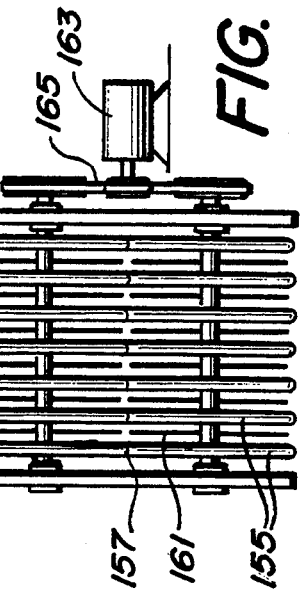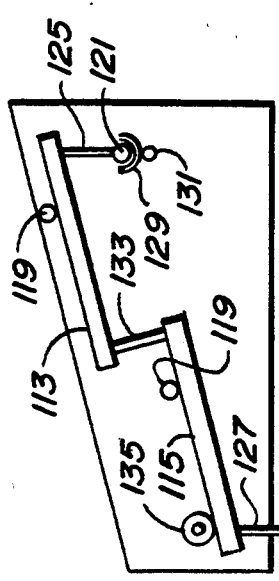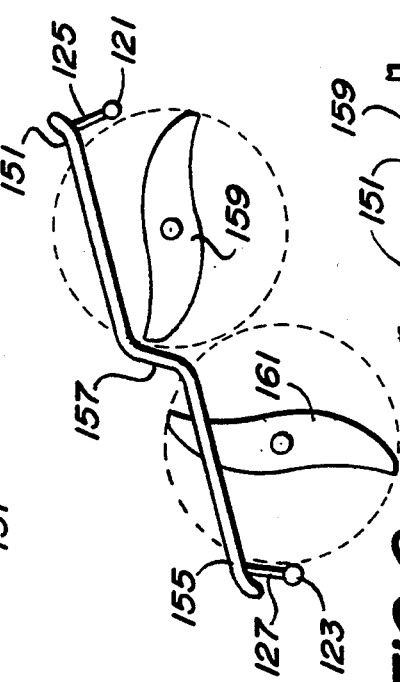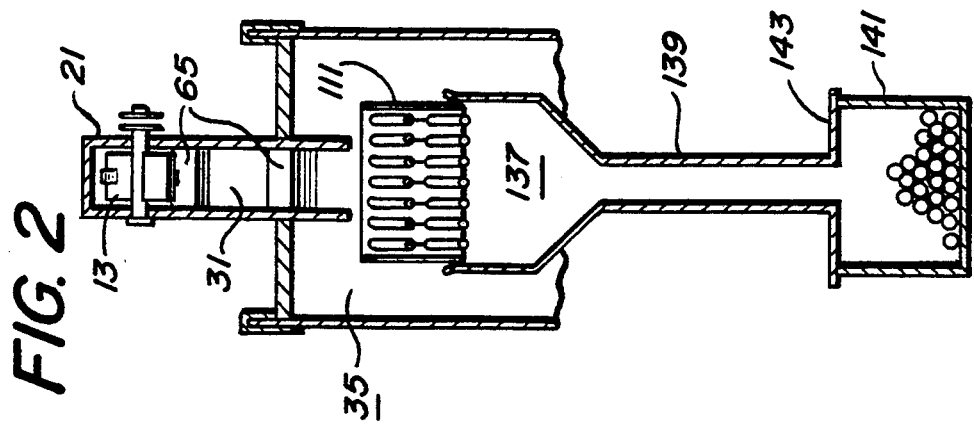

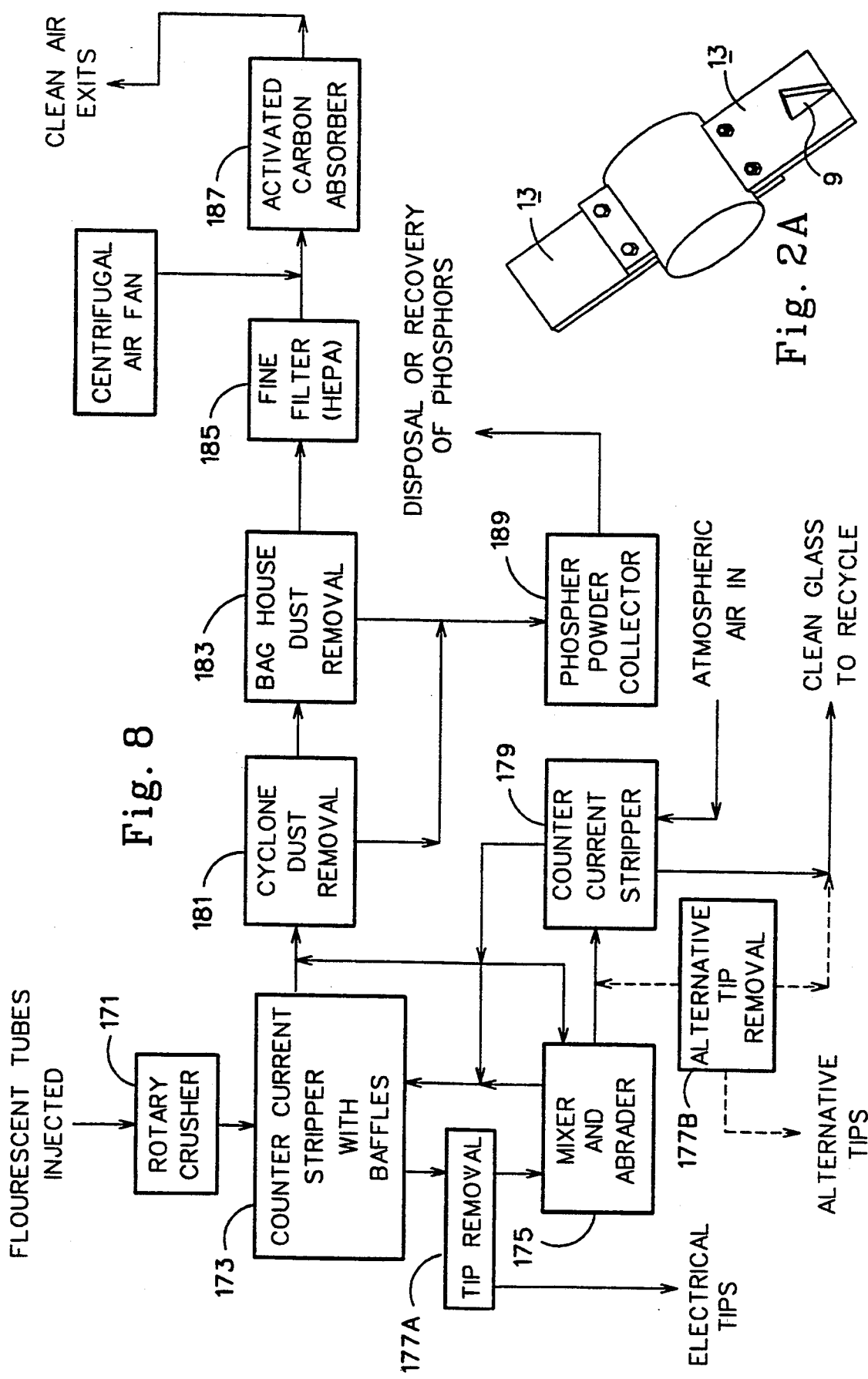

TIP SEPARATOR AND METHOD OF OPERATION FOR FLUORESCENT TUBE DIGESTER

RELATED APPLICATIONS

This application is a continuation, application Ser. No. 07/732,187, filed Jul. 8, 1991 now abandoned This application is related to several prior applications filed by the same inventor and particularly to the application entitled "Fluorescent Tube Crusher with Particulate Separation and Recovery", Ser. No. 458,177, filed Dec. 28, 1989 now U.S. Pat. No. 5,092,527, which disclosed, among other things, a system for crushing used fluorescent light tubes and separating the fractured glass particulates from potentially toxic phosphor and other powders within the original tube.

BACKGROUND OF THE INVENTION

(1) Field of the Invention

The present invention relates to the crushing or digesting of used fluorescent tubes and separating the components. More particularly the present invention relates to an improved arrangement for separating the metallic electrical tips originally capping the ends of the tubes from the fractured glass of the fluorescent tubes. More particularly, the present invention relates to an improved shape and arrangement for a so-called bar screen, or grizzly, for separating and handling metal tips and fractured glass from crushed fluorescent light tubes in a fluorescent light digestion or recycling and disposal apparatus.

(2) Discussion of the Prior Art

Fluorescent light-tubes are formed from elongated, cylindrical or tubular glass receptacles which are charged with mercury or other conductive vapors. The inside surface of the tube is coated with a fluorescent coating of some form such as phosphorus itself or other phosphor powders such as antimony, beryllium, cadmium and strontium compounds plus in some cases, lead and the like. Mercury vapor as well as beryllium, strontium, lead and cadmium are well known as potentially toxic materials as are other phosphor powders with which the inside of the fluorescent tube may be coated. Older fluorescent tubes often use high concentrations of beryllium powders, but this has been in general superseded in more recent fluorescent tubes by cadmium-type powder.

Since fluorescent tubes are, in general, bulky and unsatisfactory for disposal without treatment, it has become customary to crush them into small pieces by various means and then dispose of the fractured pieces. Merely fracturing the tube itself into small pieces for disposal, however, is not very satisfactory because of the potentially toxic nature of the dust and vapor originally confined inside the fluorescent tube. Such potentially toxic particulates, which occur mostly in the form of small dust particles plus mercury vapor and small drops or beads of mercury, can be quite detrimental if they escape to the environment.

In previous applications filed by the present Applicant, methods and means for crushing fluorescent tubes and then separating the fractured glass particulates from the potentially toxic materials contained within the original tube have been disclosed. Such methods and apparatus are based on an air separation effected between the glass particulates and the smaller toxic powders and vapors contained within the original fluorescent tubes. In particular, in accordance with such previous inventions, the fractured fluorescent tube materials are exposed to a rapidly moving body of gas such as stripping air, preferably passing countercurrently with such particulates. In this way the smaller, lighter dust and mercury vapor is carried away to a recovery system while the glass particulates are removed from the system for recycling to glass manufacturers and the like. In order to provide such separation, it is important that the glass particulates not be crushed too small so that they will have sufficient-weight such that they will not be carried away by the stripping gas together with the small toxic powder particles.

In Applicant's U.S. application Ser. No. 458,177 filed Dec. 28, 1989, now U.S. Pat. No. 5,092,527, a flat, rapidly rotating blade was disclosed for fracturing fluorescent tubes thrust down a feed chute into the path of the rotating blade. The blade, upon striking the fluorescent tube, fractured such tube into small particles and these were then conveyed by gravity and other means through a system while separating toxic powder from the surfaces both by gravity processes and particularly by countercurrent air flow or gas stripping processes. As indicated above, it is important in crushing the glass that the pieces not be too small such that they may be carried away with countercurrent stripping air, nor should such pieces of glass be too large or they will not only not pack efficiently, but will also not have an effective configuration for passage therethrough of stripping air for stripping away of the toxic powder normally adhering to the original inside surface of the fluorescent tube. Consequently, it is highly desirable for the fractured glass particulates to be of fairly uniform size and shape.

It is also not only desirable, but necessary for the electrical tips provided upon the ends of the fluorescent tubes to be removed from the fractured glass at some point, since otherwise the glass would not be readily recyclable for remelting and reuse. It is also desirable that the glass be removed cleanly from the tips with as little damage to the tip as possible since any remaining glass would interfere with recycling of metal components of the tips.

In a concurrently filed application by the same inventor, a novel fracturing or crushing blade for fluorescent tube crushers is disclosed such blade comprising essentially a rotatable blade having a flat or blunt fracture blade section from the upper portion of which there extends forwardly a relatively sharp striking blade which upon striking the tip, does minimum damage to the tip itself and upon striking the glass portion of the fluorescent tube, effects a particularly uniform fracture of the glass into relatively uniform size pieces of glass and also effects a rather clean separation of the glass from the electrical tip. The fractured glass and the tips are then passed into and through a countercurrent gas flow stripping chamber where the potentially toxic powder and metal vapors from the inside of the tube are carried upwardly away from the fractured glass particulates which fall through the countercurrent gas stripping chamber preferably being impacted several times within such chamber upon baffles which jar the fractured glass particulates and aid in detaching adherent phosphors from the surface. In accordance with a still further application of the present Applicant, the fractured glass particulates are then passed through a mixing and abrading apparatus where the fractured glass particulates are moved past each other in surface contact rubbing off residual or remaining potentially toxic phosphors and/or other powders. The fractured glass particulates passed through the mixing and abrading apparatus, which may take various forms including spiral mixing auger means, rotating cylindrical mixing apparatus, fluosolids means and the like, but preferably, at the present time, the form of a rotating auger means, are exposed again to a countercurrent stripping gas stream either concurrently with the mixing and abrading operation or subsequent thereto for removal of any toxic phosphor powders detached from the surface of the fractured glass particulates during such operation. The stripping gas from the stripping operations is then passed to a particle removal apparatus including preferably cyclone separators, bag house-type separators and one or more filters and absorbers. The fractured glass particulates during treatment subsequent to the original fracture step are desirably not further fractured, but maintained in their original fractured size range so that their size does not decrease to a point where they are likely to be stripped away with the potentially toxic powder.

As indicated above, it is necessary to remove the broken-off tips from the fractured glass particulates somewhere in the operation prior to removal of the fractured glass from the operation. Such tip removal can be accomplished at several points in the process, including immediately subsequent to the fracturing stage, subsequent to the first countercurrent stripping operation and subsequent to the second countercurrent stripping either during or subsequent to the mixing and abrading step. It has been found that with the new and improved fracture blade disclosed and claimed in the concurrently filed application, that the breaking away of the glass from the tips is essentially complete. Consequently, there is no reason to conduct the tips through the mixing and abrading operation where the tips may become damaged in any event. It has been found convenient, therefore, to remove the tips from the tube digestion operation at the conclusion of the initial countercurrent stripping and jarring operation, although other locations in the process are also possible.

Applicant originally used a vibrating screen to, in effect, screen out the tips from the fractured glass particulates. Bar-type sieving apparatus was then adopted. However, difficulty has been encountered in the use of screen-type apparatus, particularly with the filament elements of the tips becoming wrapped around the screen material in effect tying the tip to the screen and ultimately occluding the whole screen. The use of a conventional bar sieve or grizzly has also been found to not be effective. Difficulty with tangling of the electrode wires about the apparatus has been encountered and the usual trapezoidal shape of the bars has been found to interfere with effective removal of the flat glass sections through the bars.

The operation of screening out large solid particulates from smaller solid particulates or particles is an old art which may be broadly separated into four main categories of apparatus (a) grizzlies, (b) shaking screens (c) vibrating screens and (d) oscillating screens. Grizzlies and shaking screens are frequently used for larger separations of perhaps more than one inch. Oscillating and vibrating screens are customarily used for smaller separations such as in the range of 4 to 325 mesh size.

A grizzly comprises, from a technical standpoint, a set of parallel bars held apart by spacers of some form at a uniform distance. The bars are frequently made of some wear-resistant material such as manganese steel or the like. The bars are frequently in the form of a truncated downwardly oriented triangle, or trapezoid, to reduce plugging. The bars are also frequently inclined toward one end to facilitate movement of material across the surface of the grizzly. In one type of grizzly known as the self-cleaning-type, metal arms rotate between the bars to keep the spaces between open. So-called moving bar grizzlies are pivoted at one end and mounted against an eccentric shaft on the other with the eccentric at 180° apart on adjacent bars. Oscillating grizzlies and vibrating grizzlies are also known.

The present Applicant, as noted above, found conventional grizzlies and screens to be usable to separate the tips from the fractured glass particulates, but the operation was not fully satisfactory. The tips not only tended to become stuck to the equipment, but also frequently carried glass with them out of the apparatus. There has been a need, therefore, in the separation of electrical tips from fractured glass particulates during the digestion of used fluorescent light tubes for an apparatus that will not only effectively separate the tips, but will also separate the glass from such tips.

OBJECTS OF THE INVENTION

It is an object of the invention, therefore, to provide a means for effectively removing electrical tips from a stream of fractured glass particulates.

It is a further object of the invention to provide a means for removing electrical tips from fractured glass particulates which automatically dumps the tips to remove any glass or potentially toxic powder which may have become engaged with the tips.

It is a still further object of the invention to provide an apparatus that will be effective to clean the tips from crushed fluorescent light tubes at the same time they are being separated from fractured glass particulates.

It is a still further object of the invention to provide a tip separation apparatus constructed in a manner which avoids dangling electrodes from the tips from becoming wrapped about the apparatus leading to plugging of the apparatus and breakage of the electrodes or other portions of the tips and possible contamination of the glass.

It is a still further object of the invention to provide a bar-type sieve incorporating round or upwardly arcuate bars with structural cross bars widely spaced from the sieve bars and a step-type surface for manipulating electrical tips.

Other objects and advantages of the invention will become evident from reference to the accompanying drawings and description.

BRIEF DESCRIPTION OF THE INVENTION

It has been found by the present inventor that an effective separation of electrical tips from fractured glass from the crushing of fluorescent tubes can be made by the use of a series of parallel round bars interposed in the path of fractured glass particulates descending from a crushing or chopping operation. The parallel bars are made round or preferably, at least arcuate, or less preferably, otherwise curved or angled upon the upper portion to encourage the passage between them of glass particulates which are preferably of a relatively uniform size which is substantially the same in its major dimension as the dimension of the opening between the bars. The bars are inclined beyond the normal angle of repose of both the glass particulates and the tips upon such bars and additionally have a further means such as rotating blades, vibrators or the like to urge the glass to pass between the bars and the tips to slide along the bars first to a break in the bars where the height of the bars decreases suddenly at least a distance equal to the length of the tips such that in descending or falling from one level to the next, the tips describe preferably a one-half rotation in the air at the same time dumping any glass which may have been retained loose within the tip and also jarring the tip upon impact with the next level of bars such that not only is any glass clinging to the outer surface jarred loose, but any potentially toxic powder which may be clinging to the outer surface may be jarred loose and will fall between the bars where it will become entrained in countercurrent air passing up between the bars and be carried to the particle-removing means positioned later in the flow pattern or operation. The bars are secured together by cross bar means significantly spaced from the bars so as to be out of range of any electrodes dangling from the electrical tips. The preferable angle of the bars, if constructed of steel, is 17 to 19 degrees from horizontal, and less preferably, about 16 to 20 degrees.

BRIEF DESCRIPTION OF THE DRAWINGS

FIG. 2 is a diagrammatic, partially broken-away end view of the crusher and countercurrent stripping apparatus shown in FIG. 1 showing the arrangement of the tip separator of the invention.

FIG. 2A is an isometric enlargement of the rotating fracture blade shown mounted in FIGS. 1 and 2.

FIG. 3 is an enlarged diagrammatic side view of the tip separator of the invention shown in FIGS. 1 and 2.

FIG. 4 is an enlarged diagrammatic end view of the tip separation apparatus shown in FIG. 3.

FIG. 5 is a diagrammatic side illustration of an alternative embodiment of the tip separator of the invention utilizing an eccentric inclinator or rocker rather than a vibrator.

FIG. 6 is a diagrammatic side view of a still further alternative embodiment of the tip separator of the invention.

FIG. 7 is a diagrammatic end view of the tip separator shown in FIG. 6.

FIG. 8 is a flow diagram of the general treatment of fluorescent tubes in accordance with the broad invention showing alternative locations of tip removal apparatus.

DESCRIPTION OF THE PREFERRED EMBODIMENTS

Figure 1:
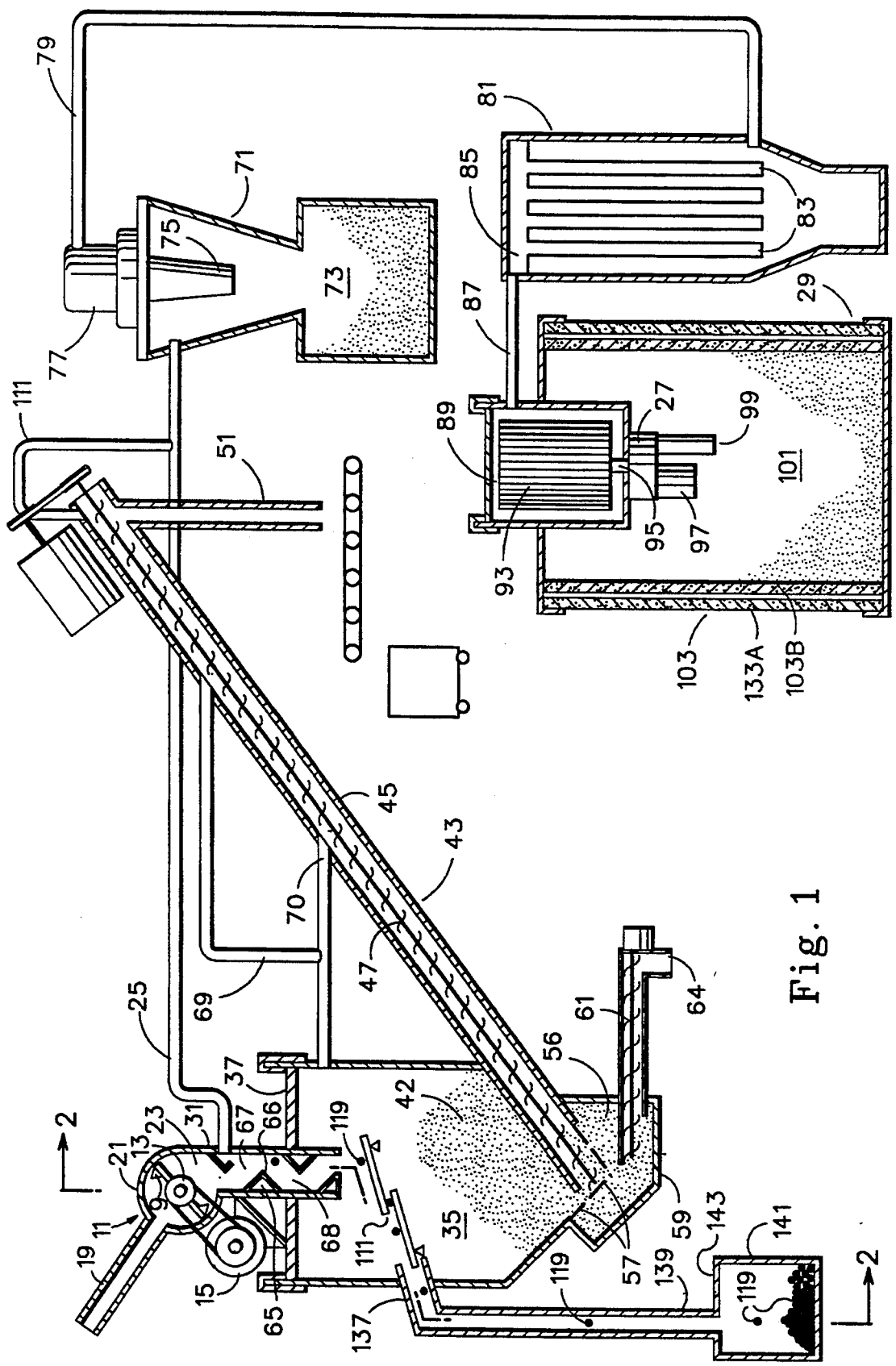
FIG. 1 is a diagrammatic partially broken-away side view of a preferred arrangement for crushing fluorescent tubes and separating the components including a tip separator in accordance with the present invention positioned after the initial countercurrent stripping chamber.

As indicated above, the basic invention upon which the present invention is an improvement provided a very efficient fluorescent tube crushing and recovery apparatus which effects a very complete dry separation between fractured glass particulates and the potentially toxic particles or dust coating the inside of the original glass envelope of a fluorescent tube plus the metallic vapor within the tube. The prior filed application of the present inventor and his co-inventor entitled "Fluorescent Tube Crusher with Particulate Separation and Recovery" discloses a fluorescent tube crushing apparatus that establishes an accelerated flow of gas through a two-part fracture and separating zone. The first portion of such zone is a fracture zone where fluorescent tubes are fractured by a rotating blade journaled rather snugly in a casing through which air or other gas is passed at a fairly rapid rate to maintain a rapid flow of gas through the chamber at all times in a downwardly direction or broadly in the direction in which the glass particulates are directed when the tubes are shattered. The flow of air or other gas is at least generally concurrent with the direction of passage of the fractured glass particulates through and from such chamber.

Immediately below the fracture chamber is positioned a countercurrent flow, gas stripping chamber through which the fractured glass particulates fall after leaving the fracture chamber. The countercurrent flow stripping chamber is supplied with a rapid flow of a dust or powder stripping gas such as air which travels generally upwardly countercurrently with respect to the glass particulates stripping away any loose powder from the surface of the glass particulates. A gas offtake is provided between the fracture chamber and the countercurrent flow chamber. Both the gas passing downwardly through the stripping chamber and the stripping gas passing upwardly through the countercurrent stripping chamber is removed through such offtake.

In a further invention, the present inventor has further found that the efficiency of separation of the toxic dust or powder from the glass particulates can be very significantly increased by the provision, preferably just subsequent to the countercurrent stripping chamber, of a mechanical arrangement for forcefully contacting glass particulates derived from the fracturing chamber with each other and moving them past each other in an abrasive surface intercontact mode or manner. Forceful contact and movement past each other of the glass particulates abrades the surface of the glass particulates which tends to either immediately separate the outer powder particles from the glass particulate or at least to loosen such particles upon the surface of the glass particulates for later removal. The abrasion treated material can then be further treated to physically separate the glass particulates from the toxic powders, preferably by use of a rapidly flowing air stream passing countercurrently with the glass particulates which will effectively separate the powder from such particulates.

The preferred and probably one of the simplest and most effective arrangements for physically abrading the surfaces of glass particulates by forcing them to move past each other in forceful contact is by means of an auger into one end of which the fractured glass particulates are fed and from the other end of which the particulates and detached powder is fed to a separation arrangement. The separation arrangement will be preferably a counter-current flow of air past the glass particulates which are preferably arranged to pass downwardly by gravitational action through the ascending countercurrent stripping air. Other arrangements are also possible, including sifting and screening including vibratory screening, fluosolids treatment arrangements and the like. The important thing, however, is to forcefully contact the fractured glass particulates with each other in a continuously changing pattern such as is attained in passage through a single auger or in almost any other sort of continuous mixing apparatus such as screws, augers, inclined paddles, revolving mixers of various types such as the ubiquitous cone mixer, mushroom mixers, tumbling barrel mixers, pug mills, ribbon blade mixers, scraping-type mixers and the like, all of which can handle material in a dry state and tumble it against itself to abrade powder material from the surface of the fractured glass material without significantly further fracturing or grinding away the glass material itself. It has been found that the adherent powder on the surfaces of the fractured glass particulates can be very effectively, efficiently, and economically separated from the glass particulates by, as explained above, entering the material into an auger or inclined plane or screen-type apparatus which transports the fractured glass particulates upwardly to a predetermined height and then drops them from a height preferably through an ascending stream of air which carries away the light separated toxic powder, but does not deviate to any great extent the fractured glass particulates thereby effectively separating the toxic powder from the fractured glass particulates.

Preferably, the glass particulates should not be significantly retarded in their passage under the influence of gravity downwardly through the stripping chamber. This, of course, depends somewhat upon the size of the glass particulates. If the glass particulates become very small or powder-sized, they will be carried upwardly, particularly if the countercurrent stripping gas flow is very fast.

The air stream exhausted from the fracturing zone and the countercurrent air flow zone as well as the air stream from the separation zone after the abrasion mixing operation is passed initially into a rough particulate separator that can be continuously cleaned or emptied, or at least has a large capacity between cleanings. A preferred separator may comprise a centrifugal or cyclone separator where the principal portion of the removed particulates are separated from the gas stream. The gas stream is then passed through a fine filter fabric or other fine filter which removes the residual dust particulates. The entire air stream is then passed through a chemically-coated activated carbon or charcoal-type filter where metallic vapor such as mercury vapor is removed from the gas. The air exiting from the activated carbon filter is completely particulate-free and has also been cleansed of metallic vapors.

As indicated above, the metallic tips upon fluorescent light tubes are inserted into the chopper along with the remainder of the fluorescent tube and are struck in the chopper by the chopping blades. It has been found that the particular chopping blade disclosed and claimed in a concurrently filed application by the present inventor causes minimum damage to such electrical tip or contacts. The tips, however, have to be separated then from the fractured glass with as little contamination of glass and phosphor powder as possible. Screening by the use of normal cross mesh screen and the use of bar-type screens frequently referred to as grizzlies, at least for the removal of fairly large materials prior to further treatment, have been used, but were found generally unsatisfactory to obtain a really effective separation of the tips. After considerable experimentation, the present inventor has developed a modified bar-type screen through which the fractured glass particulates and tips may be passed. The fractured glass which is preferably in small, generally rectangular or irregular pieces averaging not much over one-quarter inch in diameter or other major outer dimensions, falls between the bars, which are preferably round or arcuate, at least on top to prevent the glass from being conveyed along the top, and the tips are conducted along the slanted bars to the side where they fall through a chute into a collection container of some sort. Less preferably, the bars can take other curved configurations on top. The bar screen has at least one step in it from an upper to a lower level which causes the tips as they fall from the first level to such lower level, to rotate or turn end over end so that any glass particulates left in the tips is dumped out and the jar of landing on the lower level of the bar screen shakes off any clinging material such as small particles of powder or small glass particulates.

FIG. 1 shows diagrammatically a side elevation of a partially broken away depiction of the fluorescent tube treatment apparatus in which the tip separator apparatus of the invention is used. An initial fracturing and separating device or means 11 is provided with a rotating blade 13 powered by a motor 15. The rotating blade, which is preferably provided with a sharp striking point 9 in accordance with a concurrently filed application of the same inventor, is positioned to rapidly strike the end of a fluorescent tube, not shown, that is extended or passed progressively down a feed chute 19. The rotating blade 13 is preferably rotated, as shown in FIG. 1, counterclockwise so that the tube or glass envelope 17 is struck progressively breaking off small chunks of the tube which at the same time shatter into individual pieces of glass. These individual pieces of glass are thrown against the side of the chamber. The shock of both the initial fracturing and the later impact with the walls 21 of the fracture chamber 23, i.e. the upper portion containing the fracture blade 13 of the fracturing and separation device 11, causes the dust particulates coating the inside of the glass envelope to be jarred loose from the surface. These small dust particulates, which are normally adhered to the inside of the fluorescent tube by a suitable thin film of adhesive or other suitable expedients, after jarring loose become entrained in the air stream within the chamber, which air stream or flow passes initially down the feed chute 19 alongside the fluorescent tubes into such chamber and progresses through the fracture chamber 23 to the exhaust conduit or tube 25 which opens into the fracturing and separating device 11 just below the fracture chamber 23. A vacuum or suction is applied to the exhaust tube 25 from a suction or draft device farther down the line, in this case by means of a suction fan 27, as shown at the right side of FIG. 1, which fan 27 discharges air drawn through such fan with a forced draft directly into a massive activated carbon or charcoal-type filter 29 also shown in FIG. 1. Alternatively, the fan 27 could be positioned beyond the charcoal filter, particularly if it is desired to minimize escape of internal gas through any leaks in the charcoal filter housing or the like.

Below the fracturing chamber 23 of the fracturing and separating device is positioned a countercurrent flow chamber 31 having a decreased diameter lower end through which air is sucked upwardly from the terminal opening 33 from a particulate collection chamber 35 which may comprise a steel hopper-type collector or any other type collector. A top or lid 37 closes off the upper portion of the hopper-type collector and in the embodiment shown also supports the fracturing and separating device 11 or means through the side walls 39 of the countercurrent flow chamber 31.

Within the countercurrent flow chamber 31 in FIG. 1, there are provided a series of baffles or jarring surfaces 65 shown extended from the side wall of the countercurrent flow chamber 31. These baffles 65 are provided with generally upwardly directed slanted impact surfaces 67 onto which the glass particulates drop or are initially projected by the rotating blades 13 and then bounce from the first to the second of such surfaces. Opposite impact surfaces 67 of the baffles 65 are opposed surfaces 66 which define between them a tortuous passage 68. Each impact of a fractured glass particulate with the impact surfaces 67 has been found to dislodge additional powder and any other contaminants from the surfaces of the fractured glass particulates and to significantly increase the separation between the glass and the toxic powder particles. Between impact surfaces, the glass particulates pass downwardly through the countercurrent flow of stripping gas which removes dislodged toxic particles and other particulates from the immediate vicinity of the glass particulates and carries them upwardly into the suction or outlet tube 25.

The fractured or broken glass particulates, after being fractured in the fracture chamber 23, fall through the countercurrent flow chamber 31 and through the terminal orifice 33 into the collection chamber 35. During their passage, essentially in free fall straight downwardly through the countercurrent flow chamber 31, they are acted upon by upwardly flowing gases or air passing through the terminal orifice 33 from the collection chamber 35 into and through the countercurrent flow chamber 31 and into the vacuum or suction conduit 25. In all cases, the velocity of the gas passing upwardly through the countercurrent flow chamber 31 should be sufficient to strip away any loose powder adhering to the glass particulates and carry it upwardly to and out the exhaust conduit 25, but insufficient to carry upwardly any significant quantity of glass particulates. In other words, the upwardly flowing gas stream has a differential separation velocity as between powder originally coating the inner surface of the fluorescent tube and fractured glass particulates.

FIG. 2 is a diagrammatic end view of the crusher and countercurrent stripping arrangement of FIG. 1 showing the blunt or flat fracture blade 13 with the relatively sharp striking point 9 extending forwardly from it, the baffles 65 below the blade chamber and the countercurrent chamber 31 leading into the collection chamber 35, while FIG. 2A is an enlarged isometric view of the blunt fracture blade 13 with the relatively sharp striking point 9 extending forwardly in the direction of rotation from the blunt fracture blade.

As will be seen from the drawing in FIG. 1, it is physically impossible for the glass particulates to progress in a straight line through the passage 68 so that the glass particulates must, in effect, drop from one surface to the next, each time jarring and shaking the particulates and causing dislodgment of toxic powder from the surface of the glass particulates. This toxic powder is then caught up in the countercurrent air or other gas flow and carried upwardly through the tortuous passage 68 and into the take-off 25 which is positioned just below and partially in back of the upper jarring step or baffle 65c. The distance of the jarring surfaces from each other should be sufficient to allow sufficient acceleration of the glass particulates as they fall from jarring surface to jarring surface to dislodge powder from the surface of the glass particulates, but insufficient to cause additional fracturing of the glass. It is undesirable for the glass particulates to be broken into too small particles else they may also be entrained in the countercurrent gas stream and removed with the toxic powder rather than with the larger glass particulates.

As shown in FIG. 1 just below the exit to the tortuous countercurrent Stripping chamber 68 there is provided an apparatus for removing electrical tips from the stream of fractured glass particulates falling from the countercurrent stripping chamber. Such apparatus is denoted broadly by the numerical reference 111. Such tip separator apparatus, as shown in more detail in FIGS. 3 and 4, which show enlarged side and front views of the apparatus respectively is comprised of two sets of upper and lower parallel bars 113 and 115. The upper set of bars 113 are mounted at the same angle of inclination of approximately 15 degrees from the horizontal as the lower set of bars 115. The two sets of parallel bars are spaced vertically from each other by at least three (3) inches and preferably six (6) inches. Functionally, the vertical distance must be such that any electrical tip falling from the surface of the bars 113 will turn a full 180 degrees from its original disposition on the upper bars 113 and come to rest facing the other direction. This allows any tip that originally came to rest upon the upper bars 113 with its upper end facing upwardly and possibly full or partially full of glass to be in effect dumped out so that the tip ends up completely glass free. In addition, the dropping of the tip from one set of bars 113 to another 115 effectively jars the tips causing any residual glass particulates or powder particles to fall from said tips and pass through the bars 115 into the bottom of the chamber 35.

Many of the tips 119, which are very cleanly removed from the end of the fluorescent tube by the rotating blade 13 having the sharp forward projecting point 9, will have wire electrodes hanging from them. Such electrodes have a severe tendency to become wrapped about any structure in their vicinity. Because of this, it has been found necessary to remove any cross pieces holding the bars 113 and 115 together at least 3 inches and preferably 5 or 6 inches from the bars themselves. This has been accomplished as shown in FIGS. 3 and 4 in particular where it will be observed that tying or support bars 121 and 123 extending transversely between the bars 113 and 115 are positioned below the extremities Of the bars about 3 to 6 inches. This prevents any dangling electrodes extending from the tips from becoming wrapped about or otherwise engaged with the cross bars. Such entanglement will quickly stop up the separator apparatus and will also result in electrode detachment and intermixture with the glass product, rendering such product unsuitable for recycling, unless a later electrode removal operation of some sort is resorted to.

As shown in FIGS. 3 and 4, the crossbars 122 and 123 are attached to the individual bars 113 and 115 by individual downwardly extending tie plates 125 and 127 which extend directly downwardly from the upper ends of the bars 113 and the lower ends of the bars 115 where they are secured to the cross bars 121 and 123 respectively. The ends of the horizontal cross bars 121 and 123 are supported in saddles 129 which are in turn supported from bracket bars 31 welded as shown in FIG. 2 to the sides of the chamber 35.

Individual tie plates 133 extending vertically from the lower ends of the bars 113 to the upper ends of the bars 115 serve to tie the two sets of bars together so that the top bars 113 become essentially integral with the lower bars 115. A small vibrator 135 serves to vibrate the entire assembly to urge electrical tips down the bars 113 and 115 and into the chute 137 which narrows to a smaller chute 139 which empties into a receptacle 141 such as a bucket or the like having a lid 143 through which the chute 139 extends.

As will be noted, the entire assembly 111 may be lifted out of the main apparatus or chamber 35 for cleaning or other repair or refurbishing. During operation, the entire separator apparatus 111 is supported loosely in the saddles 129 and when the vibrator is operated, the entire separator apparatus is vibrated allowing the tips to slide down the separator bars 113 and 115 falling in the center from one level to another and finally passing to the chute 137. Meanwhile, the fractured glass particulates fall between the bars 113 and 115 to the bottom of the chamber 35. It is important that the tops of the bars be round or arcuate or at least curved in a manner which increases the inward angle of the bar progressively toward its inner edge. Otherwise, small pieces of glass having a size close to that which will pass between the bars have been found likely to slide down the bars supported on both sides. With the round or arcuate tops, however, the glass particulates rotate and fall through the openings between the bars which should be about the maximum of the average size of glass to be accommodated. Less preferably, the inside of the bars may be angled toward the openings between them. If, for example, the average size of glass is to be one quarter inch, which has been found to be a preferable size for most operations, the opening between the bars should be one quarter inch also. With a round top to the bars, this means that a section of glass must be at least three quarters of an inch in at least one dimension to bracket or extend across the top of two bars. Otherwise, one end of the glass will pivot and the weight of the glass will draw it down between the bars, particularly as such bars vibrate.

In FIG. 2 it will be noted that the separator bars 113 and 115 do not extend completely across the chamber 35, but do extend beyond the width of the countercurrent flow chamber 31. It is also possible for the separator to be only a little wider than the width of the countercurrent flow chamber. It is also possible, however, for the separator bars to extend completely across the chamber 35. Only a few bars have been illustrated for clarity, but normally there will be at least double the number shown. It has been found that when a very large amount of material passes down to the countercurrent flow chamber 31, there may occasionally be a surge of material building up upon the separation bars and at these times it is advantageous to have additional capacity so electrical tips do not start to fall over the sides of the separator. It may be desirable, therefore, for the separator bars to extend completely across whatever space is available.

It has also been found to be fairly critical for the angle of the steel separator bars to be between about 16 and 20 degrees from the horizontal and preferably about 17 to 19 degrees. If these critical angles are not adhered to, it has been found that the tips and glass may not completely separate. In particular, the glass particulates may not slide between the bars and the tips may not spread out sufficiently to rotate efficiently as they drop from one level to the other of the bars.

In some cases, a range of 14 to 22 degrees may be usable, but the outer limits of such range may provide only marginal performance. The critical angle may change somewhat for other materials than steel. If too steep, everything tends to slide off the separator bars, while if the angle is too shallow, the materials become backed up and interfere with operation of the separator.

The glass particulates that pass through the bars drop down to the bottom of the chamber 35 and are processed further as explained below and shown in FIG. 1 and in more generalized form in the flow sheet of FIG. 8. The tips fall from the end of the lower bars 115 into the chute 137 and then into the narrow chute 139 and finally into the receptacle or container 141. The closed chute 139 and the top or lid 143 on the container 141 prevent excess air from passing through the chute into the collection chamber 35. Some countercurrent stripping of any fine particulates or powder clinging to the tips may take place in the chute or conduit 139 through air passing into the conduit through leaks and the like. Normally, however, the tips are clean enough for further processing or disposal without further stripping.

The fractured glass particulates, after having passed through the bars of the tip separator apparatus 111 fall into the bottom of the particulate collection chamber 35. Such particulate collection chamber 35 has a substantially conical or slanted bottom 41 against which the fractured glass particulates 42 collect. Extending into such bottom from one side at an angle is an auger-type screw conveyor or mixer 43 having an outer casing 45 and an inner auger 47. The casing 45 is open at the bottom and the auger extends partially from such casing into the mound of fractured glass particulates that has collected upon the bottom 41 of the collection chamber 35. As the auger or spiral screw conveyor turns, the fractured glass particulates are drawn into the spiral conveyor, and as the conveyor rotates, such particulates are carried upwardly in the conveyor. Since the auger is continuously turning and forcing the fractured particulates upwardly, there is a considerable continuous agitation of the particulates with a continuous overturning of the particulates collected within each spiral of the auger with the result that the various particulates are rubbed continuously against each other abrading toxic powder on the original surfaces from such surfaces. Such loosened or freed toxic powder particulates, being considerably smaller than the fractured glass particulates, tend, due to the general agitation of the column of glass particulates in the auger, to work their way back down the auger while the glass particulates are carried upwardly and discharged at the top down the discharge chute 51 onto a conveyor belt 145 which discharges the clean glass particulates into a movable receptacle 147.

The toxic powder material 56, which works its way back down the rotary auger, collects at the bottom and may be allowed to pass through small openings 57 in the bottom, too small for the passage of fractured glass particulates, into a storage chamber 59 below the collection chamber 35. A helical screw-type transporter 61 extends into the storage chamber and may be used to remove the toxic powder for disposal or recovery. Such removal may be either continuous or periodic as necessary.

Alternatively, it has been found that since not a great deal of toxic powder collects at the bottom of the rotary screw auger 47, that such powder may merely be allowed to build up or collect at the bottom of the auger 47 and may be merely cleaned out during down time of the apparatus by a vacuum hose or even manual shoveling through a trap or opening in the side of the bottom of the collection chamber 35 or bottom of the auger casing 45.

While a large percentage of the toxic powder, because of its small size, works its way back down the helical screw conveyor 47 because of its relatively small size and reaches storage chamber 59, some of the toxic powder is also carried up the auger 43 with the fractured glass particulates and is discharged down discharge chute 51 with the fractured glass particulates. This toxic powder, after having passed through the abrasion device, i.e. the rotary auger 43, will have been largely abraded, however, from the surface of the fractured glass particulates.

As a result of an air inlet 63 in the side of the collection chamber 53 and interconnections 70 and 69 between the upper portions of the auger 43 and the particulate collection chamber 35, as well as a separate air or gas take-off conduit 111 at the top of the auger 43 connecting with the main stripping gas conduit 25, air is drawn rapidly up the discharge chute 51 countercurrent with the descending fractured glass material and small particles of toxic powder which, as a result of abrasion between the fractured glass particulates, have all been effectively removed from the surface of the fractured glass particulates. The air passage up the conduit 51 is sufficiently fast to carry all loose powder up the chute 51 and into the top of the auger where, because it is already entrained in the rapidly moving air, it is withdrawn with the air stream passing through the conduit 111 via off-take conduit 24 into a centrifugal separator 71 and also to some extent via conduits 70 and 69 into the collection chamber 35 where it eventually joins the countercurrent flow of air upwardly through the tortuous passage 68. This countercurrent stream of air, as explained above, joins the concurrent stream of air passing down the chute 19 and through the fracture chamber 23 and is drawn off through the off-take conduit 25.

The toxic dust carrying air passing into the exhaust or off-take conduit 25, located just under the upper baffle 65, joins air passing from conduit 111 and then passes from conduit 25 to a cyclone-type gas separator 71 where a swirling motion is set up in the air stream by the angle of the gas entering from the side. Such swirling motion combined with the increase in the volume of the passage, as generally known to those skilled in the art, causes the upper range of the small particulates entrained in the gas to move outwardly in the gas stream and to separate from the gas stream against the side of the cyclone apparatus and fall along the side wall to the bottom of the cyclone separator where the particulates can be periodically allowed to pass by gravity from the bottom of the cyclone into any suitable receptacle, not shown.

The gas from which the particulates have separated largely by having been thrown against the sides of the cyclone chamber 73 by the spiraling action of the gas, meanwhile fills the center of the chamber and wells or passes upwardly from the chamber through a central dependent conduit 75, the shape of the outer surfaces of which serves initially also to aid in initiating the swirling motion of the gas passing into the cyclone device. The upwelling gas passes through the conduit 75 into an upper chamber 77 from which it is exhausted through a further conduit 79 into the lower portion of a bag-house-type filter 81 where the air stream is filtered by conventional periodically vibrated filter bags 83. The filter bags effect a good separation between the air and toxic powder entrained in the air. The filter air is collected in the top of the bag-house-type filter 81 into the chamber 85 from whence it is discharged via conduit 87 to the top of a filter chamber 89. Within the top of the filter chamber 89 there is preferably a high efficiency HEPA-type filter 93 for removing very fine particulates from the air stream. The HEPA filter 93 is provided with an outlet 95 which leads from the filter chamber 89 to the suction fan 27 previously identified. This fan 27 is operated or rotated by a motor 97 and exhausts from an outlet 99 which opens into the approximate center of the activated carbon or charcoal filter 29 previously identified.

The activated carbon or charcoal filter 29 is shown formed of a central chamber 101 within the center of a series of flat activated carbon panels 103 usually two or more inches thick. Each panel is preferably formed of two separate panels a short distance apart designated 103A and 103B. The panels are fitted together so that an essentially gas tight chamber is formed having a fairly large central opening and outer walls formed of double carbon panels through which gas entering the central chamber and spreading out through the chamber slowly passes while metallic vapors such as mercury vapor in the gas are absorbed into the activated carbon. The large volume of the central chamber 101 and the large area of the activated carbon panels 103 surrounding the central chamber ensure that the gas velocity is slowed down sufficiently to allow sufficient retention time in the activated carbon panels 103 to absorb the metallic vapors in or upon the chemically coated activated carbon or charcoal. After the carbon panels are partially saturated with metallic vapor, the panels 103 are changed to renew the absorption capacity of the carbon filter panels.

As known to those skilled in the art, charcoal or activated carbon is a very efficient absorbent for metallic vapors such as mercury vapor and may also serve as an effective filter for very small particulates which become entrapped both on the surface and in the pores of the charcoal. Consequently, as the fan 27 exhausts the air or gas stream through the outlet 99, the mercury vapor from the interior of the fluorescent tubes is essentially carried through the entire system and finally exhausted from the outlet 99 into the center of the activated carbon or charcoal filter 29 from which the air percolates through the activated carbon or charcoal panels or filters 103A and 103B to the exterior while the mercury vapor is absorbed by the carbon or charcoal in the panels 103.

It has been found technically desirable, and from a practical operating standpoint, necessary, to have a fairly loose fit of the auger 47 within the casing 45 of the helical transporter 43, This allows more chance for the small toxic powder particulates to work their way down the auger opposite to the larger fractured glass particulates which are carried upwardly by the helical screw of the auger. Even more important, however, it allows the establishment of a more or less permanent, or at least only slowly changing, layer of fractured glass particulate material upon the inner surface of the auger housing which, it has been discovered, prevents an otherwise unacceptable wear and deterioration of the housing which is very rapidly worn away by the hard glass material.

As indicated above, while the arrangement shown in FIG. 1 is the presently preferred commercial arrangement for the mixing and abrading apparatus for practicing the method of the invention, other arrangements are also possible. In fact, almost any forced mixing apparatus suitable for mixing or mulling the glass particulates together to such an extent that the surfaces are effectively abraded by intercontact and whereby toxic powder is removed or forcibly wiped or abraded from such surfaces, will be found to be effective For example, the material could be passed either batch-wise or continuously through a rotating barrel-type mixer, preferably involving the use of mixing blades within such barrel or could be passed through a fluosolids-type apparatus in which the continuous churning of a dense mass of either air or other gas-supported particulates will fairly quickly abrade the toxic powder from the surfaces of the glass particulates. Other types of mixing apparatus in which the individual particulates are churned or agitated together, while separated by nothing more substantial than a gas such as atmospheric air, will be effective to abrade or wipe the toxic powder from the surface of the particulates after which the toxic powder can be separated from the glass particulates by a flow of separating gas.

It has been found that the apparatus of the invention provides an excellent separation of the electrical tips from crushed or fractured glass particulates from a fluorescent tube crushing apparatus as shown. Furthermore, it has been found that the combination of the crusher blade 13 with the forwardly extending fracture or striking tip 9, as shown in FIG. 1 and individually claimed in a concurrently filed application by the same applicant provides a particularly effective separation of the glass and the tip. It has been found that the striking tip 9 in striking the tip and the glass below the tip very cleanly separates all the glass from the tip with usually only loose fractured glass remaining inside. The tip separator apparatus of the present invention thereafter makes a clean separation of the loose glass from the tips as a result of the deliberatě overturning of the tips to dump out any accumulated glass.

FIG. 5 shows an alternative embodiment of the tip separator of the invention in which instead of the use of a vibrator 135 as shown in FIGS. 3 and 4 to vibrate the tip separating bars 113 and 135 there is instead an eccentric cam 149 used at the rear or upper portion of the apparatus to periodically rock the apparatus to urge separation of the fractured glass particulates and the tips. The crossbar 121 is shown riding upon the eccentric cam 149 in FIG. 5. The front or lower section of the tip separator apparatus pivots in the same saddle as shown in FIGS. 3 and 4 and in general all the other parts of the apparatus remain the same and are identified by the same reference numerals as in the prior two FIGS. 3 and 4.

FIGS. 6 and 7 show a further alternative embodiment in which a series of parallel bars 151 are bent into a shape conforming generally to the shape of the prior embodiments shown in FIGS. 105. Such bars 151, therefore, have an upper portion 153, a lower portion 155 and a step portion 157 connecting the upper and lower portions. Two sets of rotating blades 159 and 161 are journaled under the bars 151 in suitable journals and driven as shown in FIG. 7 by a motor 163 through a common belt drive 165. The two sets of blades are each composed of a series of separate thin blades mounted upon common rotary shafts 167 and 169 with a spacing which allows the blades to pass between the bars 151. As shown in FIG. 6, the blades rotate counterclockwise and have a general S-shape carefully designed so that the end of each blade never attains a position with the top surface of the bars of more than ninety degrees with respect to the top surface on the leading edge of the blade. This prevents the blade from ever extending slightly over a tip resting upon the bars. Otherwise the blade might catch the tip and jam it between the bars or even cut the tip in half while drawing it between the bars. The two blades are shown passing close to each other but not overlapping. The space between the blades is arranged to coincide with center step of the apparatus where the tips attain some momentum from sliding or rolling down the step between the upper and lower bar sections thus keeping the apparatus from jamming. However, it may also be desirable in some cases to make the path of the two sets of blades overlap so that every portion of the bars is accessible to the blades. In such case, the blades are staggered and timed with timing belt drives to maintain their rotations staggered to prevent the blades from striking each other.

FIG. 8 is a diagrammatic flow sheet of the entire process indicating where the tip separator of the invention is preferably included or located, plus several alternative locations. The used fluorescent tubes are initially injected or inserted into a rotary crusher represented by block 171. After crushing, preferably with a special blade having a central striking point as described, the crushed glass particulates are passed through a countercurrent stripper including jarring baffles represented by block 173. The solids, i.e. fractured glass particulates, electrical tips from the crushed fluorescent tubes and potentially toxic phosphor and other powders, are passed from the bottom of the stripper preferably to a mixer and abrader 175. The preferred location for the tip separator 177*a* of the invention is between the stripper 173 and the mixer and abrader 175. The electrical tips are cleanly removed from the flow stream in this apparatus as explained in the foregoing discussion and accompanying drawings. The mixer and abrader may be followed by a countercurrent stripper 179 which again removes phosphor particles from the glass particulates. Clean glass exits from the countercurrent stripper 179. As explained above, the mixer and abrader 175 may be combined with the following stripper 179 into a single apparatus. As shown, an alternative tip separator 177*b* or tip separator location may be either before or after the countercurrent separator 179.

Atmospheric air enters the stripper 179 as well as possibly other places in the overall system prior to the stripper 173 and is conducted generally back through the enumerated apparatus finally entering in serial order a cyclone-type particulate removal apparatus 181, a bag house filter 183, a HEPA filter 185 and finally an activated carbon absorbent 187 for mercury vapors. Phosphor powders are, in general, periodically removed from the cyclone 181 and bag house 183 and conducted to a phosphor powder collector 189 such as several types of covered containers or the like.

As indicated above, the present invention has been found very effective for separating electrical tips from fractured glass particulates derived from the crushing of used fluorescent tubes and useful particularly in dumping any residual loose glass out of individual tips while preventing the tips or electrodes associated with the tips from entangling with the apparatus. Use of the presently described tip separator with the special fracture blade disclosed and claimed in a concurrently filed application results in recovery of almost completely undamaged tips and no breakage at all of the tips which might otherwise result in pieces of metal becoming mixed with the fractured glass particulates, preventing them from being used as recycled glass material without further treatment.

It should be understood that although the present invention has been described at some length and in considerable detail and with some particularity with regard to several embodiments in connection with the accompanying figures and description, all such description and showing is to be considered as illustrative only and the invention is not intended to be narrowly interpreted in connection there-with or limited to any such particulars or embodiments, but should be interpreted broadly within the scope of the delineation of the invention set forth in the accompanying claims thereby to effectively encompass the intended scope of the invention.

I claim:

1. A method for removing metal electrical tips from fractured glass derived from a fluorescent tube crusher comprising:
   (a) passing used fluorescent light tubes through a tube chopping means to fracture said light tubes and provide a mixture of fractured glass particulates, potentially toxic phosphor particles and metal electrical tips,
   (b) passing said fractured glass particulates, metal electrical tips, and potentially toxic phosphor particles adhering to the surface thereof countercurrently through a stripping gas to separate toxic powder from the other components,
   (c) passing said fractured glass particulates and metal electrical tips through a tip separator comprised of at least two series of parallel bars having substantially curved upper surfaces and slanted at a low, upward angle, with the parallel bars of each series being spaced from each other at a substantially equal distance approximately the diameter of the fractured glass particulates derived from the tube chopping means,
   (d) one series of said parallel bars being positioned at a lower level than the other with a spacing and orientation between the series such that in passing under the influence of gravity from one level to the other the metal electrical tips are rotated to dump any loose glass from within the interior of the tips and through the parallel bare of the lower series, but insufficient to significantly fracture any of the glass particulates upon impacting the lower level of bars,
   (e) means acting to urge said metal electrical tips to slide downwardly along said parallel bars while fractured glass particulates pass between said bars, and
   (f) the horizontal distance between adjacent parallel bars and the configuration of the curved upper surfaces of the bars being arranged and constructed to facilitate passage of oversized fracture glass pieces edgewise between the bars, while supporting metal tips upon the upper surfaces of said bars and allowing the glass pieces to pass between said bars.

2. A method in accordance with claim 1 wherein the fractured glass particulates are received by the tip separator in a fractured condition from a prior fluorescent tube fracturing operation where used fluorescent light tubes have been fractured into more or less uniform sized fractured glass particulates by being fed to a rotating fracture blade having a substantially blunt overall striking face with a central relatively sharp striking blade extending forwardly from said blunt overall striking face, which relatively sharp striking blade initially contacts the used fluorescent tubes during the fracturing operation and the fractured glass particulates after passing through the top separator bars are subsequently passed from the tip separator to a mixing and abrading operation conducted in a rotating auger-type apparatus for further removal of toxic powder from the surface of the glass particulates.

3. An apparatus for separating electrical tips from fractured glass particulates derived from a glass fracturing apparatus arranged and constructed to fracture fluorescent tubes into relatively uniform sized glass particulates, during digestion of used fluorescent tubes comprising:
   (a) a rotatable fracture blade means having a blunt rotating striking surface from the center of which blunt striking surface extends a forwardly projected relatively sharp initial striking blade, said rotatable fracture blade being arranged to contact fluorescent tubes passed by such blade with the rotation of the blade oriented with the longitudinal length of the fluorescent tubes.
   (b) an electrical tip separating means positioned under said rotatable fracture blade means such that it receives fractured glass particulates from said blade means,
   (c) said electrical tip separating means comprising at least two series of parallel inclined separator bars each having a head end and a tail end and having transversely accurate upper surfaces said bars in each series being spaced apart approximately the average diameter of the fractured glass particulates which fall from the rotatable fracture blade means, and said bars having a diameter about twice such average diameter of the fractured glass particulates such that the distance between the tops of adjoining parallel bars is greater than the diameter of any substantial number of glass particulates and glass particulates of greater diameter than the space between the bars are encouraged to pass through the bars in an edgewise orientation,
   (d) one series of parallel bars being positioned at a greater elevation than the other series with the tail end of the more elevated series positioned over the head end of the lower series and being oriented so that material falling from the upper series falls upon the lower series of parallel bars, the two series being spaced from each other a distance such that electrical tips falling from the upper series to the lower series rotate at least one half turn while falling from one series of parallel bars to the other.

4. An apparatus in accordance with claim 3 additionally comprising rotating blade mechanical means to urge the glass particulates and tips along the inclined separator bars.

5. An apparatus in accordance with claim 3 wherein the two levels of separator bars are inclined at an angle of from 14 to 22 degrees from the horizontal.

6. An apparatus in accordance with claim 3 wherein the separator bars are uniformly spaced apart about one-quarter of an inch and are about one-half an inch in diameter.

* * * * *